United States Patent
Lee et al.

(10) Patent No.: US 9,612,453 B2
(45) Date of Patent: Apr. 4, 2017

(54) GLASSES-TYPE TERMINAL

(71) Applicant: LG Electronics Inc., Seoul (KR)

(72) Inventors: Minjong Lee, Seoul (KR); Wonseok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 14/742,499

(22) Filed: Jun. 17, 2015

(65) Prior Publication Data

US 2015/0378171 A1 Dec. 31, 2015

(30) Foreign Application Priority Data

Jun. 30, 2014 (KR) .................... 10-2014-0081171

(51) Int. Cl.
*G02C 1/00* (2006.01)
*G02C 5/00* (2006.01)
*G02B 27/01* (2006.01)
*G02C 5/02* (2006.01)
*G02C 5/14* (2006.01)
*G02C 11/00* (2006.01)

(52) U.S. Cl.
CPC .......... *G02C 5/001* (2013.01); *G02B 27/0149* (2013.01); *G02B 27/0176* (2013.01); *G02C 5/02* (2013.01); *G02C 5/14* (2013.01); *G02C 11/10* (2013.01); *G02B 2027/015* (2013.01); *G02B 2027/0163* (2013.01); *G02B 2027/0178* (2013.01)

(58) Field of Classification Search
CPC .......... G02B 2027/0138; G02B 25/001; G02B 2027/0178; G02C 11/10; G02C 7/083

USPC .................... 351/41, 158; 345/7, 8; 359/630
See application file for complete search history.

(56) References Cited

U.S. PATENT DOCUMENTS

| 9,075,249 | B2* | 7/2015 | Heinrich ................ G02C 11/10 |
| 2012/0105740 | A1 | 5/2012 | Jannard et al. |
| 2013/0235331 | A1 | 9/2013 | Heinrich et al. |
| 2013/0250503 | A1* | 9/2013 | Olsson ..................... G02C 5/12 361/679.03 |
| 2013/0258271 | A1 | 10/2013 | Cazalet et al. |

FOREIGN PATENT DOCUMENTS

| FR | 2915003 | 10/2008 |
| JP | 5462931 | 4/2014 |

OTHER PUBLICATIONS

European Patent Office Application Serial No. 15172841.7 Search Report dated Oct. 29, 2015, 6 pages.

* cited by examiner

*Primary Examiner* — Hung Dang
(74) *Attorney, Agent, or Firm* — Lee, Hong, Degerman, Kang & Waimey (57) ABSTRACT

Provided is a glasses-type terminal including: a frame that is worn on a user's head; a display unit provided to the frame, on which visual information is displayed; a control module that controls the display unit; and a bridge that is combined with the frame along a length direction of the frame and with which a nose-supported portion that is supported by a user' nose is combined, in which the frame includes an external frame that is exposed to the outside, and an internal frame that is combined with an internal side of the external frame and comes into contact with the user's head, and in which the bridge is arranged between the external frame and the internal frame.

19 Claims, 7 Drawing Sheets

GLASSES-TYPE TERMINAL

CROSS-REFERENCE TO RELATED APPLICATIONS

Pursuant to 35 U.S.C. §119(a), this application claims the benefit of earlier filing date and right of priority to Korean Application No. 10-2014-0081171, filed on Jun. 30, 2014, the contents of which are all hereby incorporated by reference herein in its entirety.

BACKGROUND OF THE DISCLOSURE

1. Field of the Disclosure

The present invention relates to a glasses-type terminal in which lenses that are suitable for user's eyes are removably attached.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

For example, a nose-supported portion of the glasses-type terminal is a fixed type. Thus, only lenses that are custom-designed for a nose-supported portion of the glasses-type terminal can be attached. Because of this construction, the user cannot wear glasses that agree with his/her eyesight.

SUMMARY OF THE DISCLOSURE

Therefore, an aspect of the detailed description is to provide a glasses-type terminal in which lenses that agree with user's eyesight are attached.

Another aspect of the detailed description is to provide a glass-type terminal in which lenses are removably attached.

To achieve these and other advantages and in accordance with the purpose of this specification, as embodied and broadly described herein, there is provided a glasses-type terminal including: a frame on a user's head; a display unit provided to the frame, the display unit displaying visual information; a control module controlling the display unit; and a bridge combined with the frame along a length direction of the frame and combined with which a nose-supported portion supported by a user' nose is combined, in which the frame includes an external frame exposed to the outside, and an internal frame combined with an internal side of the external frame and coming into contact with the user's head, and in which the bridge is arranged between the external frame and the internal frame.

In the glasses-type terminal, the external frame may include a first portion of which an upper surface makes up an upper surface of the external frame, and which faces inward, a second portion that extends downward from the first portion, and a third portion that extends inward from the second portion.

In the glasses-type terminal, the bridge may include an insertion portion inserted into the frame and an exposure portion extending downward from the insertion portion and exposed to the outside, and combined with the nose-supported portion.

In the glasses-type terminal, an insertion hole in which the bridge is inserted may be formed along a length direction, a groove may be formed in an internal surface of the internal frame, and a first hole into which a pin is inserted may be formed in the groove.

In the glasses-type terminal, a plate that is formed to cover the pin may be formed in the groove, and a second hole may be formed in the plate in such a manner that a screw keeps the plate close to the internal frame.

In the glasses-type terminal, a plate may be elastic, and an accommodation groove that accommodates the pin may be formed in the bridge.

In the glasses-type terminal, a flexible circuit board may be arranged in a space that is formed by the first to third portions, and the exposure portions may formed under both lower ends of the insertion portion, respectively.

In the glasses-type terminal, the bridge may be inserted into the internal frame, and a bent member that keeps the flexible circuit board and the bridge positioned away from each other is formed in the internal frame, and a recess portion that accommodates the bent member may formed in the first portion.

In the glasses-type terminal, a portion of the frame, with which the bridge is combined, may be bent in such a manner as to be positioned below the other portions, and a portion of the frame, with which the bridge is combined, may be bent inward.

In the glasses-type terminal, the plate may be formed in a direction in which the groove is formed and may be accommodate by the groove, In the glasses-type terminal, a step portion may be formed to protrude from an end of the bridge in such a manner that the step portion is locked into the insertion hole, and protrusion portions may be formed to protrude from ends of the first portion and the third portion, respectively, in such a manner that the portions face each other, and the protrusion portions may be inserted into the internal frame, thereby combining the external frame and the internal frame.

Effects of the glasses-type terminal according to the present invention are as follows, According to at least one embodiment of the present invention, lenses that agree with user's eyesight can be attached for use.

In addition, according to at least one embodiment of the present invention, the insertion portion in which the bridge is inserted is formed in the glasses-type terminal and attached lenses can be exchanged with other lenses by a simple operation.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
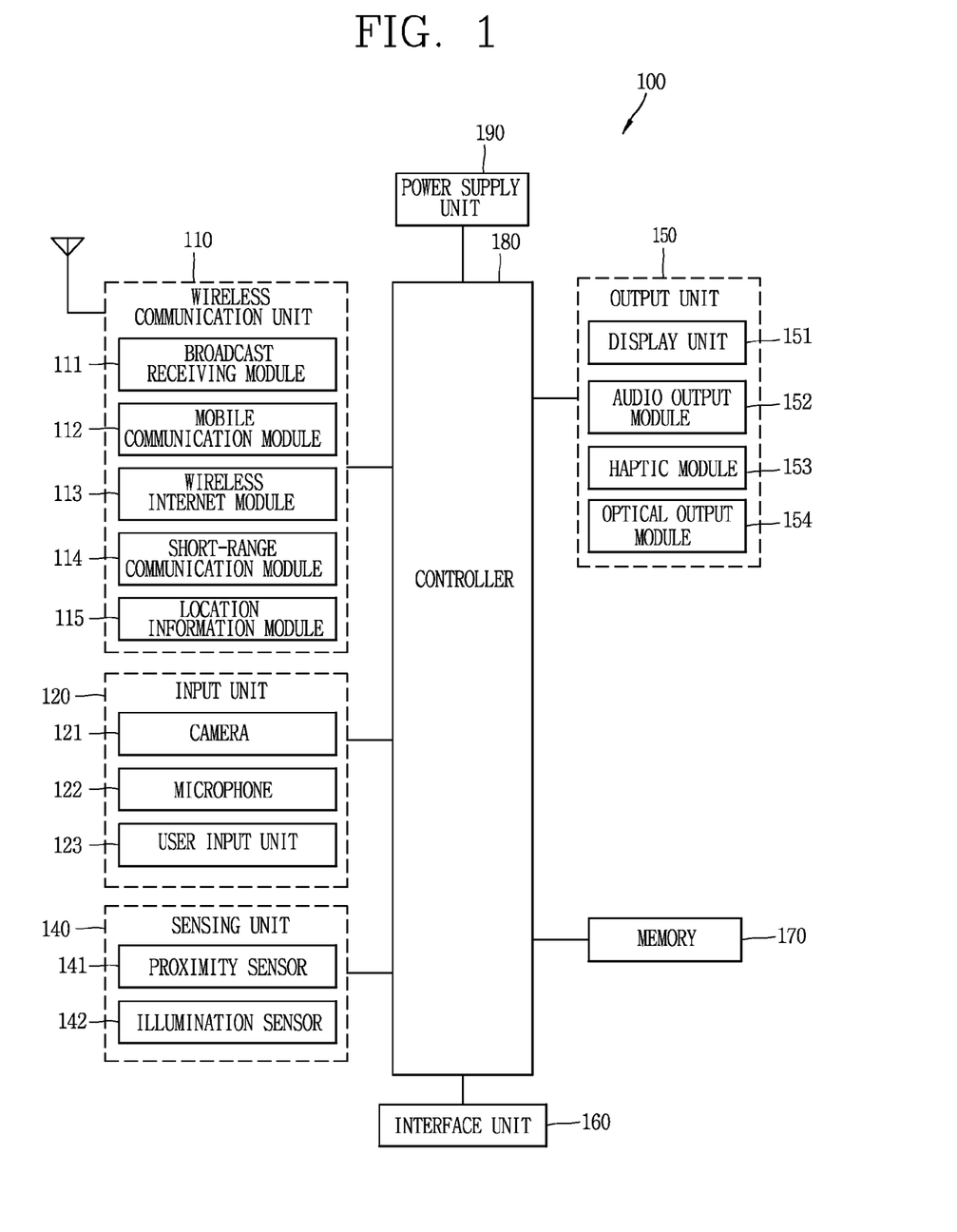
FIG. 1 is a block diagram for describing a glasses-type terminal according to the present invention.

FIG. 1 is a block diagram of a glasses-type terminal 100 according to an embodiment of the present invention.

The glasses-type terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the glasses-type terminal 100 and a wireless communication system, communications between the glasses-type terminal 100 and another mobile terminal, communications between the glasses-type terminal 100 and an external server. Further, the wireless communication unit 110 typically includes one or more modules which connect the glasses-type terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The glasses-type terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the glasses-type terminal 100 and a user, as well as function as the user input unit 123 which provides an input interface between the glasses-type terminal 100 and the user.

The interface unit 160 serves as an interface with various types of external devices that can be coupled to the glasses-type terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the glasses-type terminal 100 may perform assorted control functions associated with a connected external device, in response to the external device being connected to the interface unit 160.

The memory 170 is typically implemented to store data to support various functions or features of the glasses-type terminal 100. For instance, the memory 170 may be configured to store application programs executed in the glasses-type terminal 100, data or instructions for operations of the glasses-type terminal 100, and the like. Some of these application programs may be downloaded from an external server via wireless communication. Other application programs may be installed within the glasses-type terminal 100 at time of manufacturing or shipping, which is typically the case for basic functions of the glasses-type terminal 100 (for example, receiving a call, placing a call, receiving a message, sending a message, and the like). It is common for application programs to be stored in the memory 170, installed in the glasses-type terminal 100, and executed by the controller 180 to perform an operation (or function) for the glasses-type terminal 100.

The controller 180 typically functions to control overall operation of the glasses-type terminal 100, in addition to the operations associated with the application programs. The controller 180 may provide or process information or functions appropriate for a user by processing signals, data, information and the like, which are input or output by the various components, or activating application programs stored in the memory 170.

As one example, the controller 180 controls some or all of the components so as to drive application programs that have been stored in the memory 170. For driving of the application programs, the controller 180 may operate at least two of the components included in the glasses-type terminal 100, through a combination.

The power supply unit 190 can be configured to receive external power or provide internal power in order to supply appropriate power required for operating elements and components included in the glasses-type terminal 100. The power supply unit 190 includes a battery, and the battery is configured to be built-in (mountable) or chargeable.

At least some of the components may operate in cooperation with one another in order to implement an operation, control or control method of the mobile terminal according to various exemplary embodiments to be described below. The operation, control or control method of the mobile terminal may be implemented on the mobile terminal by the execution of at least one application program stored in the memory 170.

A recent mobile terminal is configured as a wearable device that is wearable on a human body, beyond the conventional technique of a user grasping the mobile terminal using his or her hand. An example of such wearable device is a smart watch, a smart glass, a head mounted display (HMD), etc. Hereinafter, examples of the glasses-type terminal, implemented as such wearable device will be explained.

A wearable device may be configured to be able to exchange data with the glasses-type terminal 100 (or otherwise cooperate with the glasses-type terminal 100). The short-range communication module 114 may sense or recognize the wearable device, and permit communication between the wearable device and the glasses-type terminal 100. In addition, when the sensed wearable device is a device which is authenticated to communicate with the glasses-type terminal 100, the controller 180, for example, may cause transmission of data processed in the glasses-type terminal 100 to the wearable device via the short-range communication module 114. Hence, a user of the wearable device may use the data processed in the glasses-type terminal 100 on the wearable device. For example, when a call is received in the glasses-type terminal 100, the user may answer the call using the wearable device. Also, when a message is received in the glasses-type terminal 100, the user can check the received message using the wearable device.

Figure 2:
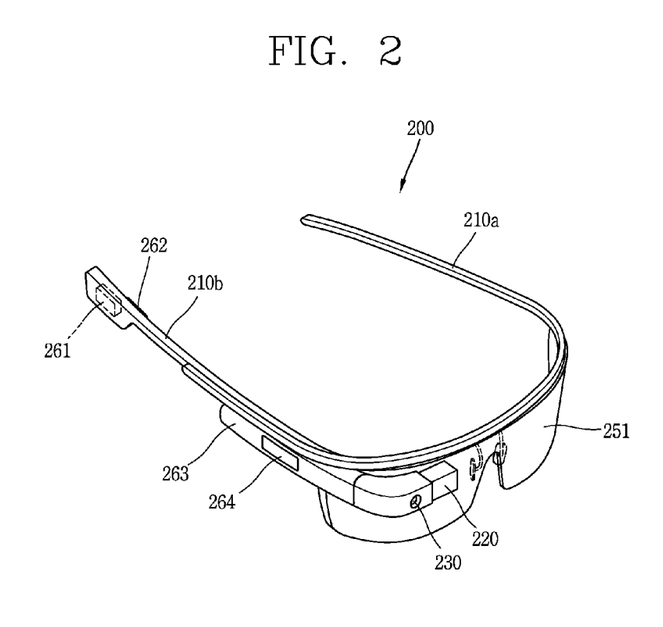
FIG. 2 is a perspective diagram of the glasses-type terminal according to one embodiment of the present invention.

FIG. 2 is a perspective view illustrating one example of a glass-type mobile terminal 100 according to another exemplary embodiment.

The glass-type mobile terminal 200 can be wearable on a head of a human body and provided with a frame (case, housing, etc.) therefor. The frame may be made of a flexible material to be easily worn. The frame of mobile terminal 200 is shown having a first frame 210a and a second frame 210b, which can be made of different materials.

The frame may be supported on the head and defines a space for mounting various components. As illustrated, electronic components, such as a control module 263, an audio output module 261, and the like, may be mounted to the frame part. Also, a lens 251 for covering either or both of the left and right eyes may be detachably coupled to the frame part.

The control module 263 controls various electronic components disposed in the mobile terminal 200. The control module 263 may be understood as a component corresponding to the aforementioned controller 180. FIG. 2 illustrates that the control module 263 is installed in the frame part on one side of the head, but other locations are possible.

A display unit 220 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200, the display unit 220 may be located to correspond to either or both of the left and right eyes. FIG. 2 illustrates that the display unit 220 is located on a portion corresponding to the right eye to output an image viewable by the user's right eye.

The display unit 220 may project an image into the user's eye using a prism. Also, the prism may be formed from optically transparent material such that the user can view both the projected image and a general visual field (a range that the user views through the eyes) in front of the user.

In such a manner, the image output through the display unit 220 may be viewed while overlapping with the general visual field. The mobile terminal 200 may provide an augmented reality (AR) by overlaying a virtual image on a realistic image or background using the display.

A camera 230 may be located adjacent to either or both of the left and right eyes to capture an image. Since the camera 230 is located adjacent to the eye, the camera 230 can acquire a scene that the user is currently viewing.

In this embodiment, the camera 230 is provided at the control module 263. However, the camera 230 may be positioned at most any location of the mobile terminal. In some embodiments, multiple cameras 230 may be utilized. Such multiple cameras 230 may be used to acquire a stereoscopic image.

The glass-type mobile terminal 200 may include user input units 262 and 264, which can each be manipulated by the user to provide an input. The user input units 262 and 264 may employ techniques which permit input via a tactile input. Typical tactile inputs include a touch, push, or the like. The user input units 262 and 264 are shown operable in a pushing manner and a touching manner as they are located on the frame part and the control module 263, respectively.

If desired, mobile terminal 200 may include a microphone which processes input sound into electric audio data, and an audio output module 261 for outputting audio. The audio output module 261 may be configured to produce audio in a general audio output manner or an osteoconductive manner. When the audio output module 261 is implemented in the osteoconductive manner, the audio output module 261 may be closely adhered to the head when the user wears the mobile terminal 200 and vibrate the user's skull to transfer sounds.

Figure 3:
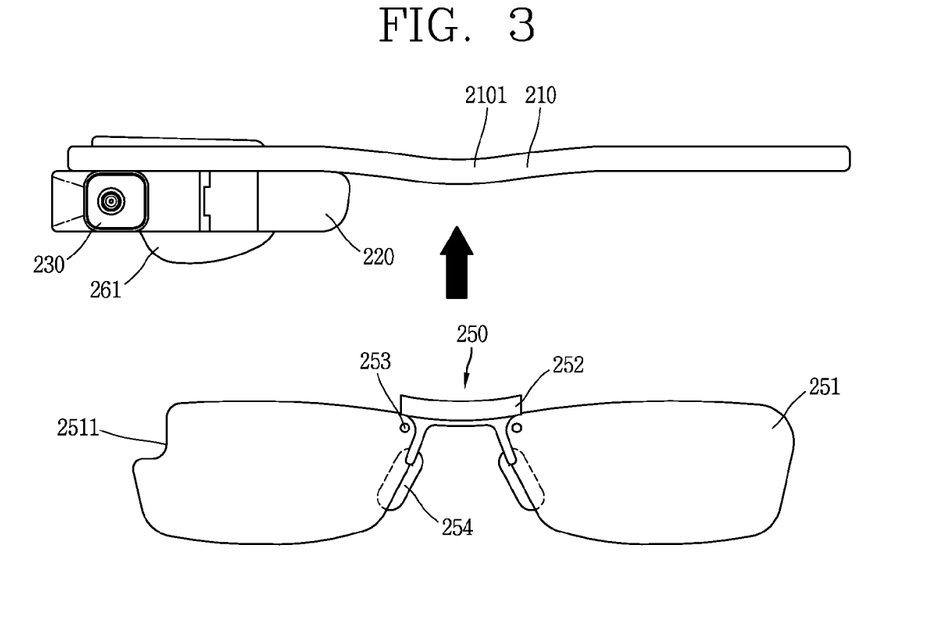
FIG. 3 is a diagram illustrating a shape of a pre-combined glasses-type terminal according to one embodiment of the present invention.
Figure 4:
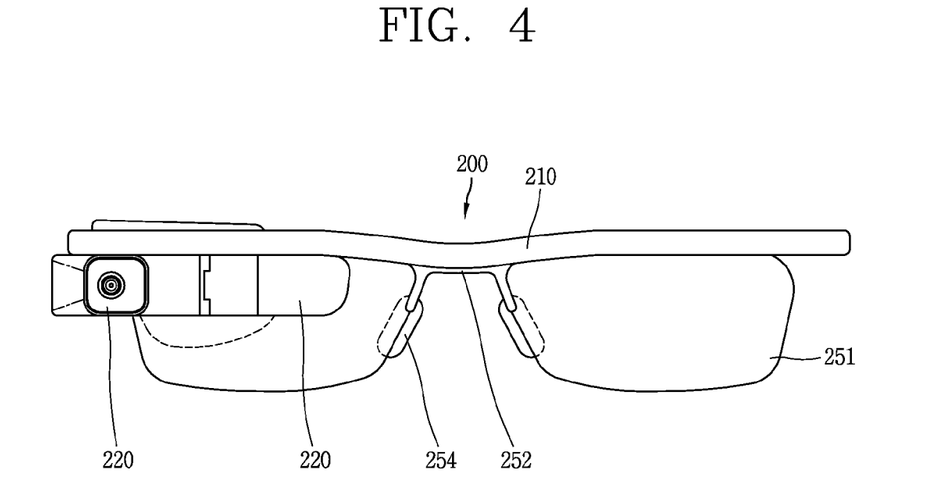
FIG. 4 is a diagram illustrating a shape of a post-combined glasses-type terminal according to one embodiment of the present invention.

FIG. 3 is a diagram illustrating a shape of a pre-combined glasses-type terminal 200 according to one embodiment of the present invention. FIG. 4 is a diagram illustrating a shape of a post-combined glasses-type terminal 200 according to one embodiment of the present invention.

First, referring to FIG. 3, a camera 230, a display unit 220, and the like are combined with a frame 210. A user who does not wear glass lenses 251 does not need an attachment that fastens the glass lenses 251 to the frame 210, but a user who wears glasses need to attach the glasses lenses 251 to the glasses-type terminal 200 using a bridge 252.

In the related art, in some cases, the bridge 252 is not available. Furthermore, even though the bridge 252 fixed to the frame 210 is provided, the use cannot arbitrarily exchange the glass lenses 251.

According to the present invention, the bridge 252 that can be held against the frame 210 is provided to the frame 210 in order to solve this problem. FIG. 3 illustrates a process in which an assembly 250 of the bridge 252 and the glass lens 251 is combined with the frame 210. FIG. 4 illustrates a state where the assemble 250 is combined with the frame 210.

As illustrated in FIG. 3, the user holds the purchased lenses 251 against the bridge 252 using screws 253. A segment 2511 is cut from one of the left and right lenses 251, which faces the direction of the display unit 220 and the camera 230. This is done in order to properly engage the segment-cut lens 251 with a control module 263 when the assembly 250 is combined with the frame 210.

Figure 5:
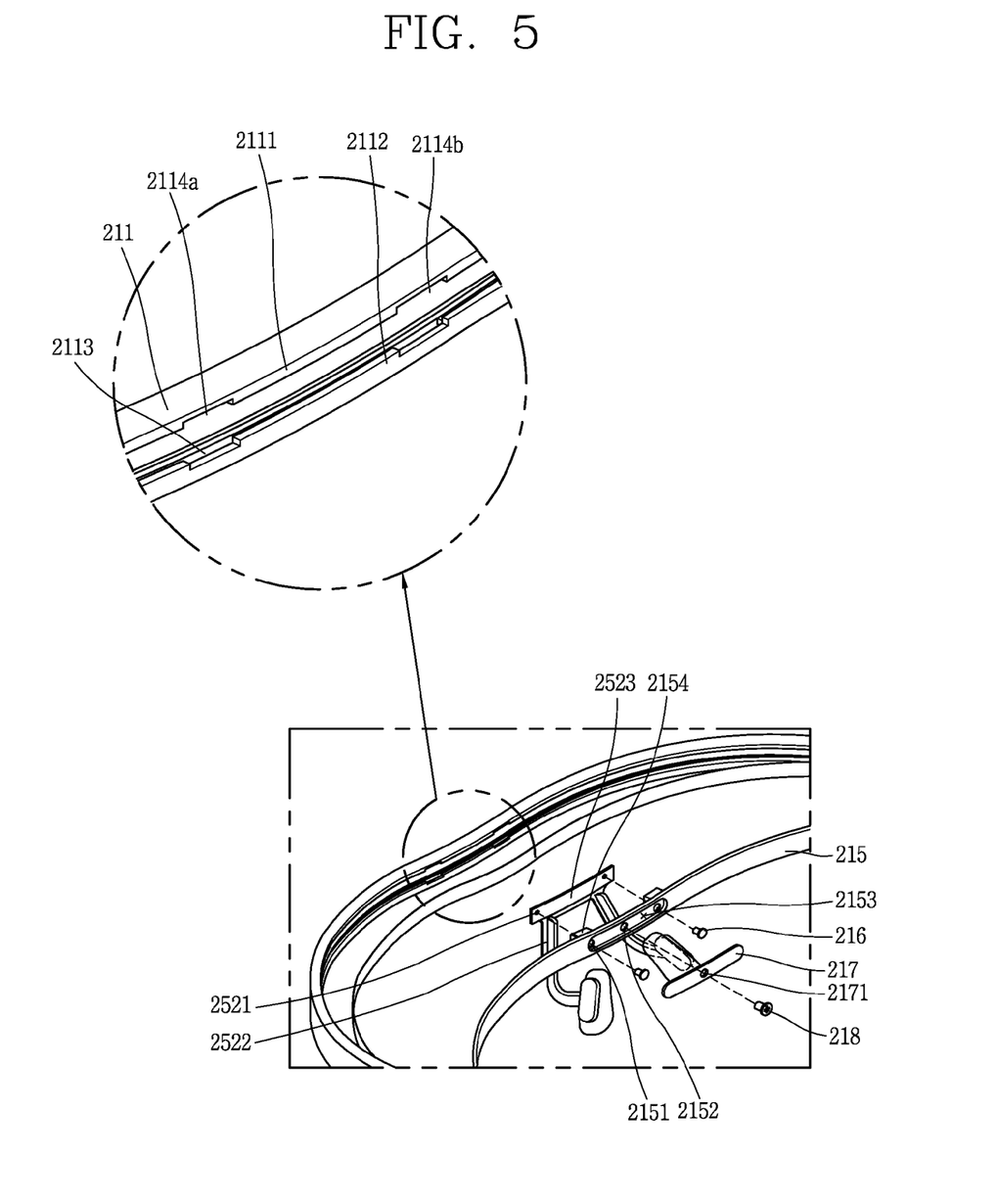
FIG. 5 is a perspective exploded diagram of the glasses-type terminal according to one embodiment of the present invention.
Figure 6:
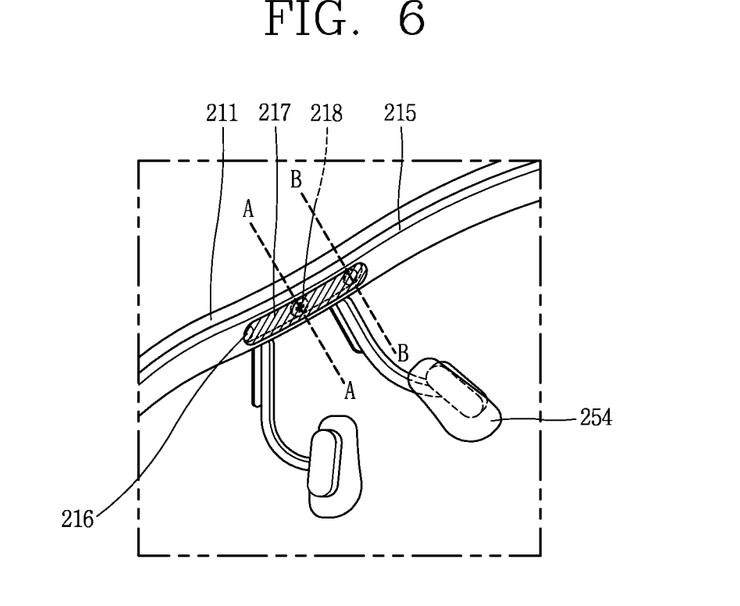
FIG. 6 is a diagram illustrating in detail a bridge according to one embodiment of the present invention.

FIG. 5 is a perspective exploded diagram of the glasses-type terminal according to one embodiment of the present invention. Referring to FIGS. 3 to 5, the glasses-type terminal 200 according to one embodiment of the present invention includes the frame 210, the display unit 220, the control module 263, and the bridge 252. The frame is worn on a user's head. The display unit 220, on which visual information is displayed, is provided to the frame 210. The control module 263 controls the display unit 222. The bridge 252, with which a nose-supported portion 254 that is supported by a user's nose is combined, is combined with the frame 210 along a length direction of the frame 210.

The frame 210 includes an external frame 211 and an internal frame 215. The external frame 211 is exposed to the outside. The internal frame 215, which is combined with the inside of the external frame 211, comes into contact with the user's head. The bridge 252 is arranged between the external frame 211 and the internal frame 215. More specifically, the bridge 252 is arranged within a space that is formed when the external frame 211 and the internal frame 215 are combined, At this point, the external frame 211 is a frame that is exposed to the outside when the glasses-type terminal 200 is worn, and the internal frame 215 is a frame that comes into contact with the user's head without being exposed to the outside when the glasses-type terminal 200 is worn.

Figure 9:
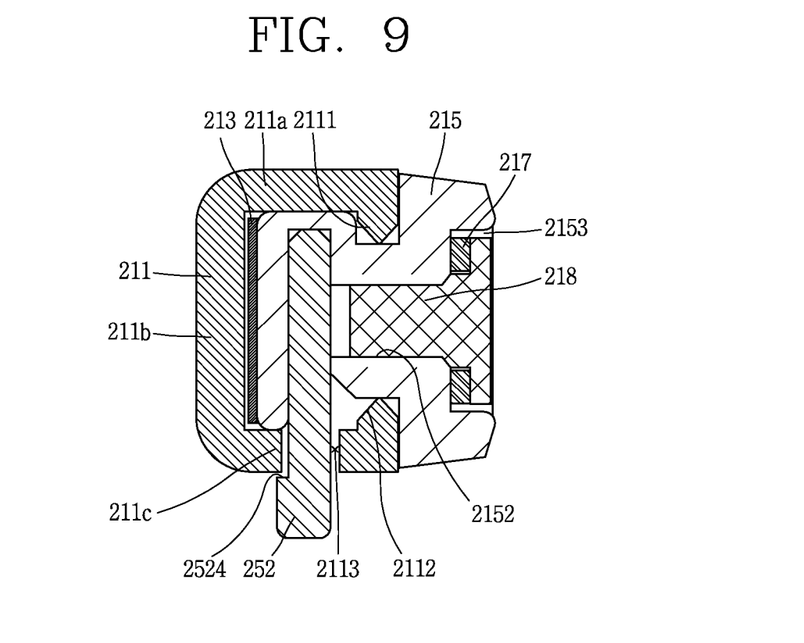
FIG. 9 is a cross-sectional diagram taken along line A-A on FIG. 6.

In addition, as illustrated in FIG. 9, the external frame 211 is configured to include a first portion 211a, a second portion 211b, and a third portion 211c. The first portion 211 faces inward. The second portion 211b extends downward from the first portion 211a. The third portion 211c extends inward from the second portion 211b, That is, the external frame 211 is approximately C-shaped.

According to one embodiment of the present invention, an upper surface is defined as an exposed-outside surface that faces upward when the glasses-type terminal is worn, a front surface is defined as an exposed-outside surface that faces forward, and a lower surface is defined as an exposed-outside surface that faces downward.

For example, referring to FIG. 9, an exposed-outside surface of the first portion 211a that faces upward is the upper face, an exposed-outside surface of the second portion 211b that faces forward is the front surface, and an exposed-outside surface that faces downward is the lower surface.

The bridge 252, as illustrated in FIG. 5, includes an insertion portion 2523 and an exposure portion 2522. The insertion portion 2523 is inserted into the frame 210, without being exposed to the outside. The exposure portion 2522 extends downward from the insertion portion 2523 and is exposed to the outside. The insertion portion 2523 is formed along a length direction (horizontal direction) of the frame 210. A pair of exposure portions 2522 is formed approximately perpendicular to the insertion portion 2523 so that the nose-supported portion 254 may be combined to the pair of the exposure portions 2522. At this point, the nose-supported portions 254 in a pair may be formed in parallel with each other, but it is desirable that for stable contact with a nose bridge, a distance between the two nose-supported portions should become greater as they extends downward. That is, the exposure portions 2522 are formed under both lower ends of the insertion portion 2523, respectively.

The bridge 252 has to be inserted from the outside and be fixed in a state where the frame 210 is completely assembled. For this reason, a passage through which the bridge 252 is inserted is necessary. To do this, according to one embodiment of the present invention, a bridge insertion hole 2113 is formed in the third portion 211c along the length direction of the frame 210.

Figure 10:
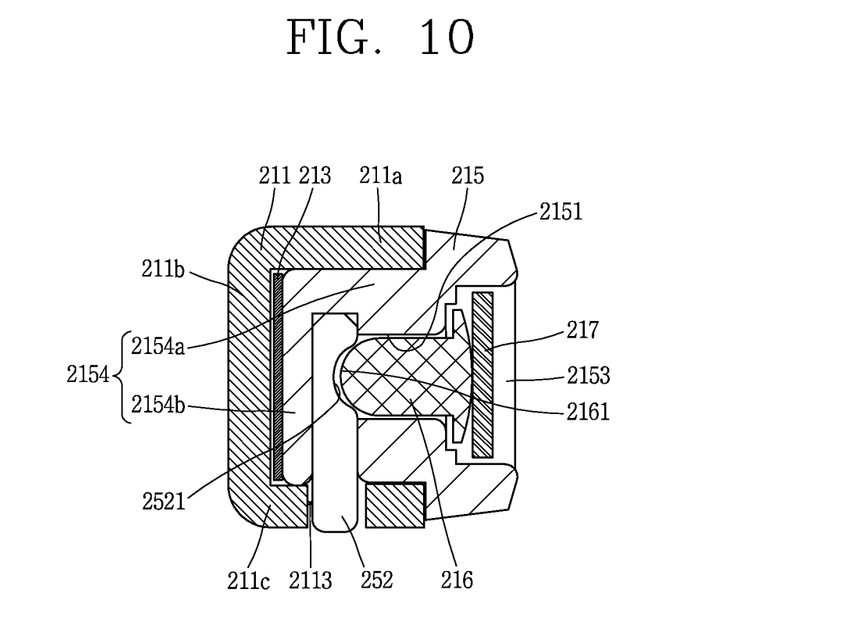
FIG. 10 is a cross-section diagram taken along line B-B on FIG. 6.

Referring to FIG. 5, an insertion hole 2113 is formed in the third portion 211c of the external frame 211 so that the bridge 252 may inserted into the frame 210 from below the insertion 2113. The bridge 252 is inserted from below the external frame 211, but is not fixed by the external frame 211. According to one embodiment of the present invention, the bridge 252 is inserted into the internal frame 215. As illustrated in FIG. 10, a bent member 2154 is arranged on an external surface of the internal frame 213. A space into which to insert the bridge 252 is formed inside of the bent member 2154. The bent member 2154 is approximately L-shaped. The bridge 242 is inserted into the space that is formed by the bent member 2154 and the internal frame 215.

On the other hand, flexible circuit board 213 is arranged within the space formed by the first, second, and third portions 211a, 211b, and 211c, in a manner that faces the internal surface of the second portion 211b. The bent member 2154 keeps the flexible circuit board 213 and the bridge 252 spatially separated from each other. The bent member 2154 is configured to include a horizontal extension portion 2154a and a vertical extension portion 2154b. The horizontal extension portion 2154a extends toward the external frame 211. The vertical extension unit 2154b that extends vertically down from the horizontal extension 2154a and comes into contact with the flexible circuit board 213. The vertical extension portion 2154b and the horizontal extension portion 2154a are perpendicular to each other and a combination of the vertical extension portion 2154b and the horizontal extension portion 2154a is L-shaped.

In addition, according to one embodiment of the present invention, one or more pins 216 are used to prevent the bridge 252, which is inserted into the space inside of the bent member 2154, from slipping downward. The pins 216 are formed in a groove 2153 that is formed in an internal side of the internal frame 215. The groove 2153 of which a length corresponds to the insertion hole 2113 is formed in a vertical surface of the internal frame 215. A first hole 2151 which the pin 216 passes through is formed in the groove 2153. A leading portion 2161 of the pin 216 passes through the first hole 2151 and comes into contact with the bridge 252. An accommodation groove 2521 that accommodates the pin 216 is formed in the bridge 252 in order to hold the bridge 252 in place and thus to prevent the bridge 252 from slipping. The accommodation groove 2521 is formed in such a manner that the leading portion 2161 of the pin 216 fits into the accommodation groove 2521.

In addition, the plate is arranged in the groove 2153. The plate 217 prevents the pin 216 from protruding inward by applying pressure to the pin 216. A second hole 2171 is formed in the plate 217 in such a manner that a screw 218 keeps the plate 217 close to the internal frame 215. At this point, for the plate 217, a flat elastic plate is used.

That is, the plate 217 is arranged on the groove 2153 and one or more first holes 2151, 2152 are formed in the internal frame 215. Thus, the pin 216 passes through the internal frame 215 and comes into contact with the bridge 252. The screw 218 keeps the plate 217 close to the internal frame 215 and at the same time prevents the pin 216 from bouncing outward.

Figure 7:
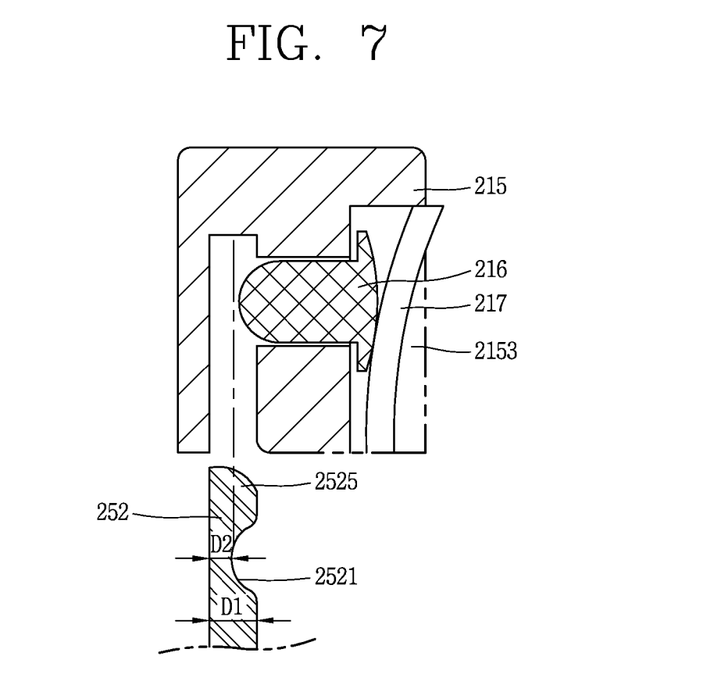
FIG. 7 is a cross-sectional diagram for describing a process in which the bridge according to one embodiment of the present invention is inserted into the internal frame.

FIG. 7 illustrates in more detail a process in which the pin 216 passes through the elastic plate 217 and is combined with the internal frame 215, and in a state where the plate is held against the internal frame 215 by the screw 218, the bridge 252 is inserted into the bent member 2154 in a state.

A thickness D1 of a portion of the bridge 252, in which the accommodation groove 2521 is formed, is smaller than thicknesses D2 of portions of the bridge 252 other than the portion, in which the accommodation groove 2521 is formed. With this construction, when a leading portion 2525 of the bridge 252 is inserted into the bent member 2154 and comes into contact with the leading portion of the pin 216, the bridge 252 is no longer moved.

Figure 8A:
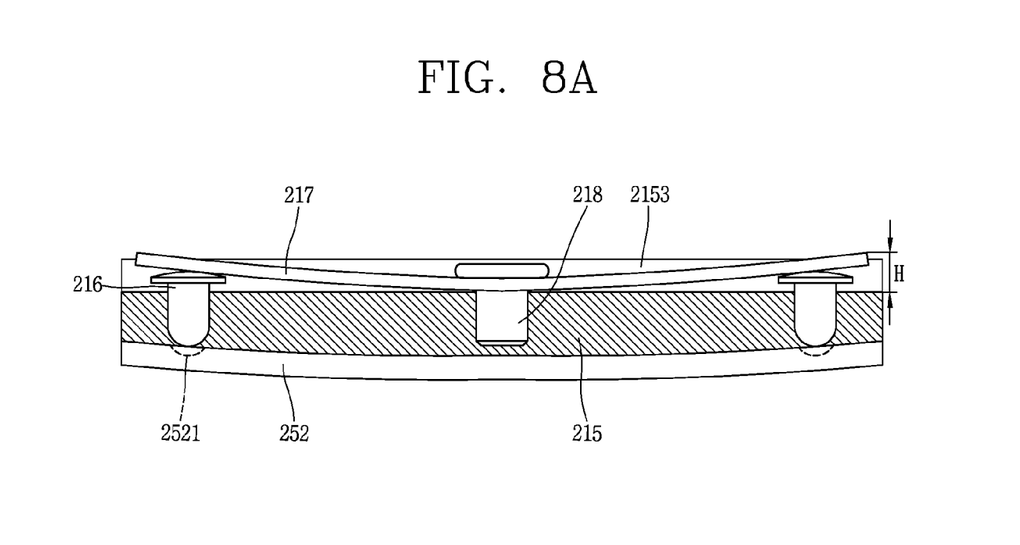
FIGS. 8A and 8B are plane diagrams for describing a process in which the bridge according to one embodiment of the present invention is inserted into the internal frame.
Figure 8B:
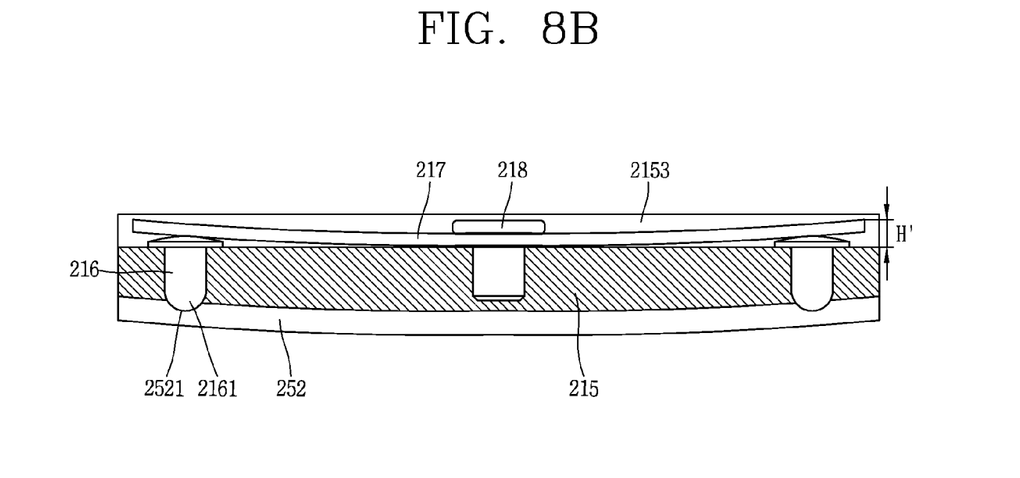

Thus, the bridge 252 has to be forced to be pushed up in order to insert the bridge 252 into the bent member 2154. While the bridge 252 is forced to be inserted into the bent member 2154 in this manner, as illustrated in FIG. 8A, both end portions of the plate 217, like those of a bow, are bent upward with the middle of the plate 217 being fixed by the screw 218. When the bridge 252 continues to be inserted in this state, the leading portion 2161 of the pin 216 reaches the accommodation groove 2521, thereby being held in place there. When the pin 216 is held in place in the accommodation unit hole 2521, as illustrated in FIG. 8B, the plate 217 is brought into contact with the groove 2153 in the internal frame 215 or falls short of being brought into contact.

At this time, it is desirable that a height of the groove 2153 be greater than a thickness of the plate 217. More specifically, a maximum distance H' between the plate 217 and the internal frame 215 has to be smaller than the height of the groove 2153. In addition, a maximum exposure height of the screw 218 also has to be smaller than the height of the groove 2153. This is because the internal surface of the internal frame 215 comes into contact directly with the user's head and no portion may protrude inward. However, as illustrated in FIG. 8A, while the bridge 252 is being inserted, any height to which an end portion of the plate 217 is raised from the internal frame 215 may be possible as long as it is not excessively high. The plate 217 is accommodate in this manner by the groove 2153 and the plate 217 is formed along a direction in which the groove 2153 is formed.

On the other hand, as illustrated in FIG. 5, the bent member 2154 is accommodated by recess portions 2114a and 2114b that are formed in an internal surface of the external frame 1. More specifically, the recess portions 2114a and 2114b are formed in one portion of the first portion 211a. A protrusion portion is provided between the recess portions 2114a and 21114b.

That is, referring to FIG. 9, the protrusion portions 2111 and 2112 are formed to protrude from ends of the first portion 211a and the third portion 211c, respectively, in such a manner that they face each other. The protrusion portions 2111 and 2112 are inserted into the internal frame 215, thereby combining the external frame 211 and the internal frame 215.

In addition, as illustrated in FIG. 9, a step portion 2524 is formed to protrude from an end of the bridge 252 in such a manner that the step portion 2524 is locked into the insertion hole 2113. As illustrated in FIG. 3, a portion 2101 of the frame 210, with which the bridge 252 is combined, is bent in such a manner as to be positioned below the other portions or is bent inward. In this manner, the glasses-type terminal 200 is easy to support on the user's nose.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An eyewear-type terminal comprising:
a frame shaped to be worn on a user's head;
a display coupled to the frame;
a controller configured to control the display;
a plate; and
a bridge configured to be coupled to the frame along a length direction of the frame, the bridge coupled to a nose-supported portion that is in contact with the user's nose when the terminal is worn by the user,
wherein the frame includes:
an external frame having an external side and an internal side; and
an internal frame having a first side coupled to the internal side of the external frame and a second side facing the user's head, and
wherein:
the internal frame comprises a groove formed at the second side of the internal frame and shaped to receive the plate;
the groove comprises a pair of first holes through which pins are inserted and a second hole formed between the pair of first holes; and
the plate comprises a third hole through which a screw is inserted such that the screw inserted through the third hole is further inserted into the second hole.

2. The terminal of claim 1, wherein the external frame includes:
a first portion corresponding to an upper side of the external frame;
a second portion extended from the first portion in a first direction; and
a third portion extended from the second portion in a second direction that is substantially perpendicular to the first direction such that the second portion is located between the first portion and the third portion that are in parallel, the third portion corresponding to a lower side of the external frame.

3. The terminal of claim 2, wherein:
the first portion is shaped to form a first protrusion portion and the third portion is shaped to form a second protrusion portion such that the first protrusion portion and the second protrusion portion face each other; and
the first and second protrusion portions are inserted into the internal frame to couple the external frame and the internal frame.

4. The terminal of claim 2, wherein the third portion of the external frame comprises an insertion hole into which the bridge is inserted.

5. The terminal of claim 4, wherein a step portion is formed to protrude from an end portion of the bridge such that the step portion is locked into the insertion hole.

6. The terminal of claim 2, further comprising a flexible circuit board located at a space formed by the first portion, the second portion, and the third portion of the external frame.

7. The terminal of claim 6, wherein:
the bridge is inserted into the internal frame; and
the internal frame comprises a bent member shaped to keep the flexible circuit board and the bridge away from each other.

8. The terminal of claim 7, wherein the first portion of the external frame comprises a recess portion shaped to accommodate the bent member.

9. The terminal of claim 2, wherein the bridge includes:
an insertion portion configured to be inserted into the frame; and
an exposure portion extending from the insertion portion and coupled to the nose-supported portion.

10. The terminal of claim 9, wherein the exposure portion comprises a pair of exposure portions, one of the pair of exposure portions extended from a first lower end of the insertion portion and the other of the pair of exposure portions extended from a second lower end of the insertion portion.

11. The terminal of claim 1, wherein the internal frame comprises:
a groove formed at the second side of the internal frame; and
a first hole formed on the groove such that a pin is inserted through the first hole.

12. The terminal of claim 11, further comprising a plate sized to fit in the groove that is shaped to receive the plate such that the pin inserted into the first hole is covered by the plate placed in the groove, the plate comprising a hole through which a screw is inserted to keep the plate in the groove of the internal frame.

13. The terminal of claim 12, wherein the internal frame further comprises a second hole formed on the groove such that the screw inserted through the hole of the plate is inserted into the second hole.

14. The terminal of claim 12, wherein the plate is a flat elastic plate.

15. The terminal of claim 11, wherein the bridge comprises an accommodation groove configured to accommodate the pin inserted through the first hole of the internal frame.

16. The terminal of claim 1, wherein the bridge is detachable from the frame.

17. The terminal of claim 16, wherein the bridge is configured to hold a lens that is replaceable.

18. The terminal of claim 1, wherein the bridge is coupled to the frame via a space formed when the external frame and the internal frame are coupled.

19. The terminal of claim 1, wherein:
the bridge is located between the external frame and the internal frame; and
the pins are located between the bridge and the plate.

* * * * *